US009001373B2

(12) United States Patent
Morgana et al.

(10) Patent No.: US 9,001,373 B2
(45) Date of Patent: Apr. 7, 2015

(54) PARALLEL PRINTING SYSTEM

(75) Inventors: Stephen C. Morgana, Rochester, NY (US); R. Victor Klassen, Harrisonburg, VA (US); Andrew D. Spooner, Webster, NY (US); Christopher S. Meteyer, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 57 days.

(21) Appl. No.: 13/435,469

(22) Filed: Mar. 30, 2012

(65) Prior Publication Data
US 2013/0258375 A1 Oct. 3, 2013

(51) Int. Cl.
*G06K 15/00* (2006.01)
*G06K 15/02* (2006.01)
*G06F 3/12* (2006.01)

(52) U.S. Cl.
CPC .......... *G06K 15/1822* (2013.01); *G06F 3/124* (2013.01); *G06K 15/1823* (2013.01); *G06K 15/1857* (2013.01)

(58) Field of Classification Search
CPC ..... G06F 3/124; G06F 3/1213; G06F 3/1215; G06F 3/1244; G06F 3/1248; G06F 3/1284; G06F 3/1296; G06K 15/02
USPC ........ 358/1.1, 1.11–1.18, 400–404, 537–540, 358/448, 449, 452, 453, 462; 709/201–203, 709/217–219; 718/1, 100–108; 382/302–307, 276
See application file for complete search history.

(56) References Cited

U.S. PATENT DOCUMENTS

| | | | |
|---|---|---|---|
| 6,441,919 B1 * | 8/2002 | Parker et al. ................. | 358/1.18 |
| 6,817,791 B2 | 11/2004 | Klassen | |
| 7,161,705 B2 | 1/2007 | Klassen | |
| 7,872,767 B2 | 1/2011 | Klassen | |
| 2004/0196497 A1 | 10/2004 | Klassen et al. | |
| 2005/0162667 A1 * | 7/2005 | Felix et al. .................... | 358/1.1 |
| 2006/0055952 A1 * | 3/2006 | Ferlitsch ...................... | 358/1.13 |
| 2006/0139679 A1 * | 6/2006 | Barry et al. .................. | 358/1.13 |
| 2008/0018935 A1 * | 1/2008 | Gauthier et al. ............. | 358/1.18 |
| 2008/0218809 A1 * | 9/2008 | Chen et al. .................... | 358/407 |
| 2009/0161163 A1 * | 6/2009 | Klassen et al. ............... | 358/1.18 |
| 2009/0225369 A1 | 9/2009 | Gordon et al. | |
| 2010/0039669 A1 * | 2/2010 | Chang et al. ................. | 358/1.15 |
| 2010/0202008 A1 * | 8/2010 | Aronshtam et al. ......... | 358/1.15 |
| 2010/0290080 A1 | 11/2010 | Klassen | |
| 2011/0222091 A1 * | 9/2011 | Ward et al. ................... | 358/1.13 |

FOREIGN PATENT DOCUMENTS

EP 1850221 A2 10/2007

* cited by examiner

*Primary Examiner* — Chad Dickerson
(74) *Attorney, Agent, or Firm* — Pillsbury Winthrop Shaw Pittman, LLP

(57) ABSTRACT

A parallel Raster Image Processor system that includes a plurality of Raster Image Processors (RIPs) for parallel processing of a plurality of document jobs into a printer-ready format for the printing of the document jobs and a splitter. The splitter configured to combine the plurality of document jobs to form a plurality of chunks, each chunk is sent to a respective designated RIP for processing.

26 Claims, 3 Drawing Sheets

PARALLEL PRINTING SYSTEM

CROSS REFERENCE TO RELATED APPLICATION

The following co-pending application, U.S. patent application Ser. No. 13/435,412, is assigned to the same assignee of the present application. The entire disclosure of this co-pending application is incorporated herein by reference in its entirety.

BACKGROUND

1. Field

The present disclosure relates to a system and a method of operating a printing system for parallel processing of a plurality of document jobs with a plurality of Raster Image Processors (RIPs) into a printer-ready format for printing of the document jobs.

2. Description of Related Art

Generating a print-ready documents to be printed by a printing system requires acquiring all the information (e.g., content, graphics, production specifications, etc.) required to view, process and output the desired document in an electronic format understandable by a print engine. Such systems range from those that are simple and modestly expensive, such as are well known to consumer users of personal computer systems, up to commercial printing systems that are capable of generating in the range of one thousand pages per minute in full color. All systems though have a high level objective of printing faster.

The process of converting information in the form of graphics, fonts and character placement information, and pictorial image content into a print-ready form, generally a raster image, possibly compressed or encoded in some way, is commonly known as Raster Image Processing (RIPping), and performed by what is called a Raster Image Processor (RIP). In any printing system, the speed is limited by the speed of the printer itself, (which is independent of the document complexity), and the speed of the RIP (which generally depends on the document, and may also depend on properties of the printer, such as its resolution, and its ability to support color), whichever is slower. The present application includes an embodiment that is directed at accelerating the RIP.

There are three general approaches that have been applied in the past for accomplishing the objective of printing faster. First, faster serial processing methods optimize the software and use faster and more expensive processors. Second, job parallel processing sends separate jobs to separate systems and then prints them on a common printer. Third, Portable Document Format ("PDF") based page parallel systems convert the job to PDF, and then split the PDF file into pages which are converted to print-ready format on multiple independent processors, with the job being printed on a common printer.

Software optimization has its limitations and faster processors are also limited by currently available technology. Job parallel processing results in poor single job performance, unpredictable job time and reduced throughput when there is only one long job in the queue. The existing PDF-based solutions are slow due to their need to often convert from a different input language into PDF and then write the PDF file into an input spool disk. Page parallel processing has suffered from the inefficiencies of a throughput disadvantage because per job overhead occurs on a per page basis.

Accordingly, in the continuing need for improving efficiency and speed in printing systems, there is a need for a system which is not limited to mere job parallelism or page parallelism and that facilitates control and data flow of a print job to the printing system while splitting the print job(s) into a plurality of chunks or print job portions, each of which is processed independently and in parallel. The splitting operation is generally performed by a splitter in the printing system.

Small or short document jobs often present problems in printing systems. First, there is a per-job overhead at various points in the printing system and short document jobs are inefficiently processed because of this per-job overhead. When split, these short document jobs produce small chunks (i.e., print job portions)—they cannot produce chunks longer than the jobs themselves. These chunks appear as individual jobs to the RIPs. Each of these chunks or individual jobs have a per-job overhead. For example, two pages are generally processed by the RIP per second (for a job of appropriate complexity). With a one second overhead per job, document jobs less than 50 pages long run at least three percent slower than they would without the per-job overhead.

Another problem arises in continuous feed printing systems. To be efficient, these printing systems should be kept running for as long as possible. This is best suited to jobs having thousands of pages. The continuous feed printing systems are not efficient when processing small or short document jobs.

Applicants of the present disclosure have proposed a system and a method of operating a printing system for parallel processing of a plurality of small or short document jobs with a plurality of Raster Image Processors (RIPs) into a printer-ready format for printing of the document jobs that addresses at least the problems noted above.

SUMMARY

According to one aspect of the present disclosure, a parallel Raster Image Processor system is provided. The system includes a plurality of Raster Image Processors (RIPs) for parallel processing of a plurality of document jobs into a printer-ready format for the printing of the document jobs and a splitter. The splitter is configured to combine the plurality of document jobs to form a plurality of chunks, each chunk is sent to a respective designated RIP for processing.

According to another aspect of the present disclosure, a method of operating a printing system for parallel processing of a plurality of document jobs with a plurality of Raster Image Processors (RIPs) into a printer-ready format for the printing of the document jobs is provided. The method is implemented in a computer system that includes one or more processors configured to execute one or more computer program modules. The method includes combining the plurality of document jobs to form a plurality of chunks, each chunk is sent to a respective designated RIP for processing.

According to yet another aspect of the present disclosure, a reversible splitter is provided. The splitter is configured to combine a plurality of document jobs to form at least one chunk, the plurality of document jobs is received by a Raster Image Processor system including at least one Raster Image Processor (RIP) and each chunk is sent to a respective designated RIP for processing.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure includes an implementation of parallel document processing, which is referred to as "chunk" parallelism. Chunk parallelism is an intermediate level of parallelism between job parallelism and page parallelism. In a "chunk" processing system, job(s) are taken from a queue and broken down into pages or other divisible "chunks," with the chunks being sent to multiple RIP processors to be converted in parallel so that individual groups of pages or "chunks" can be output in logical page order (e.g., chunks 1, 2, 3).

The term "document," as used in the present disclosure, refers to either a single page or multiple pages that can be represented either as hard copy or in some intermediate electronically stored format for later rendering to a human understandable form such as hard copy or video display. The term "print job," as used in the present disclosure, refers to one or more documents or sets of documents being sent to or received by a particular addressee or designee. The term "document job" is the Page Description Langue (PDL) form of an individual document submitted to the print queue.

A chunk is a collection of rasterized data consisting of at least one page and not more than one print job. Print job parallelism occurs when a print job is smaller than the minimum chunk size, while page parallelism occurs when the minimum chunk size is 0 (bytes/pages). A chunk may be an integer number of pages less than an entire print job but has a startup overhead occurring on a chunk basis as opposed to a per page basis.

Figure 2:
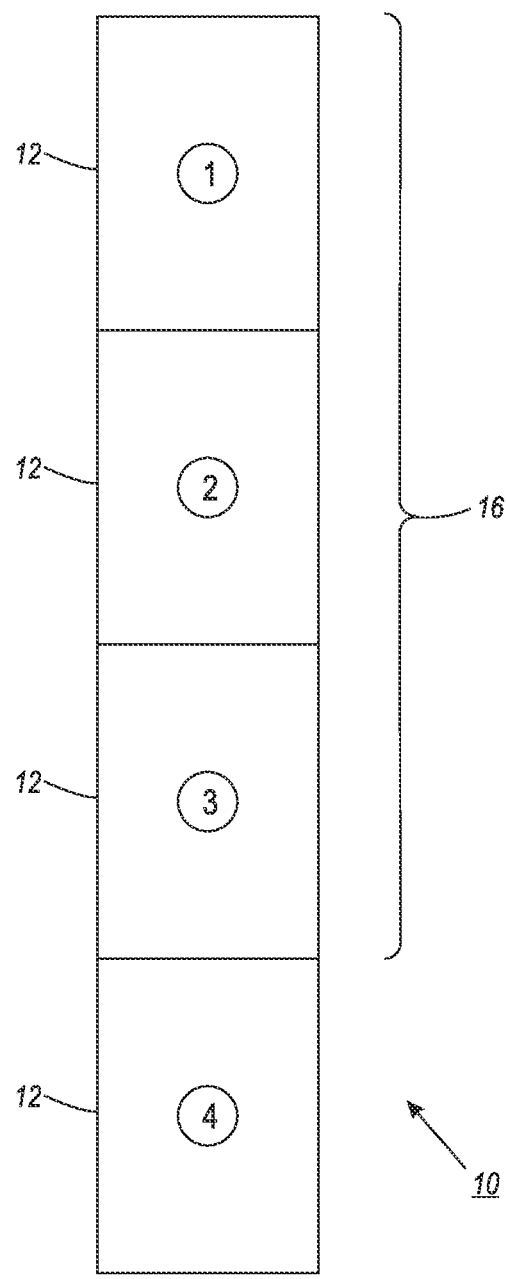
FIG. 2 is a schematic representation of a print job for showing page and possible chunk boundaries.

For example, referring to FIG. 2, a particular print job 10 may include multiple pages 12 and several of the pages 12 are associated together into a "chunk" 16 for rasterizing by an assigned RIP node. Chunk parallelism is described in detail, for example, in U.S. Pat. No. 7,872,767, titled "Parallel Printing System," which is incorporated herein by reference in its entirety.

As described in detail below, in the present disclosure, a plurality of short or small document jobs is taken from a queue and is combined to form a large print job (e.g., print job 10 shown in FIG. 2). The large print job may then be split into chunks that are sent to multiple RIP processors for processing. Though document jobs are combined into one large print job, the splitter retains knowledge of the original document job boundary locations within the large print job. Also, as described in detail below, the system of the present disclosure combines the plurality of small document jobs into the large print job, while converting language and optimizing resources.

Figure 1:
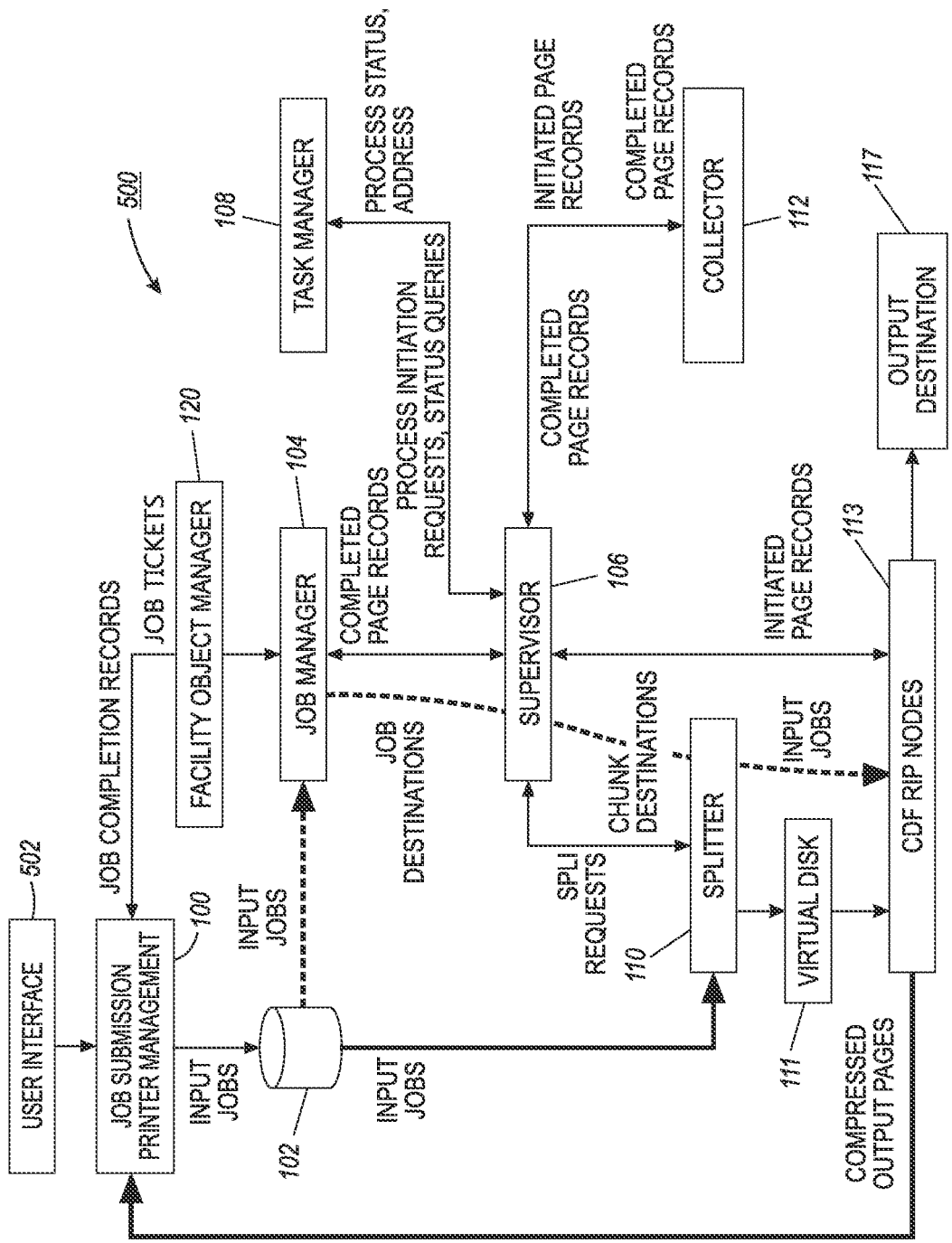
FIG. 1 is a block diagram illustrating the architecture for control and data flow of an image printing system formed in accordance with an embodiment of the present disclosure.
Figure 3:
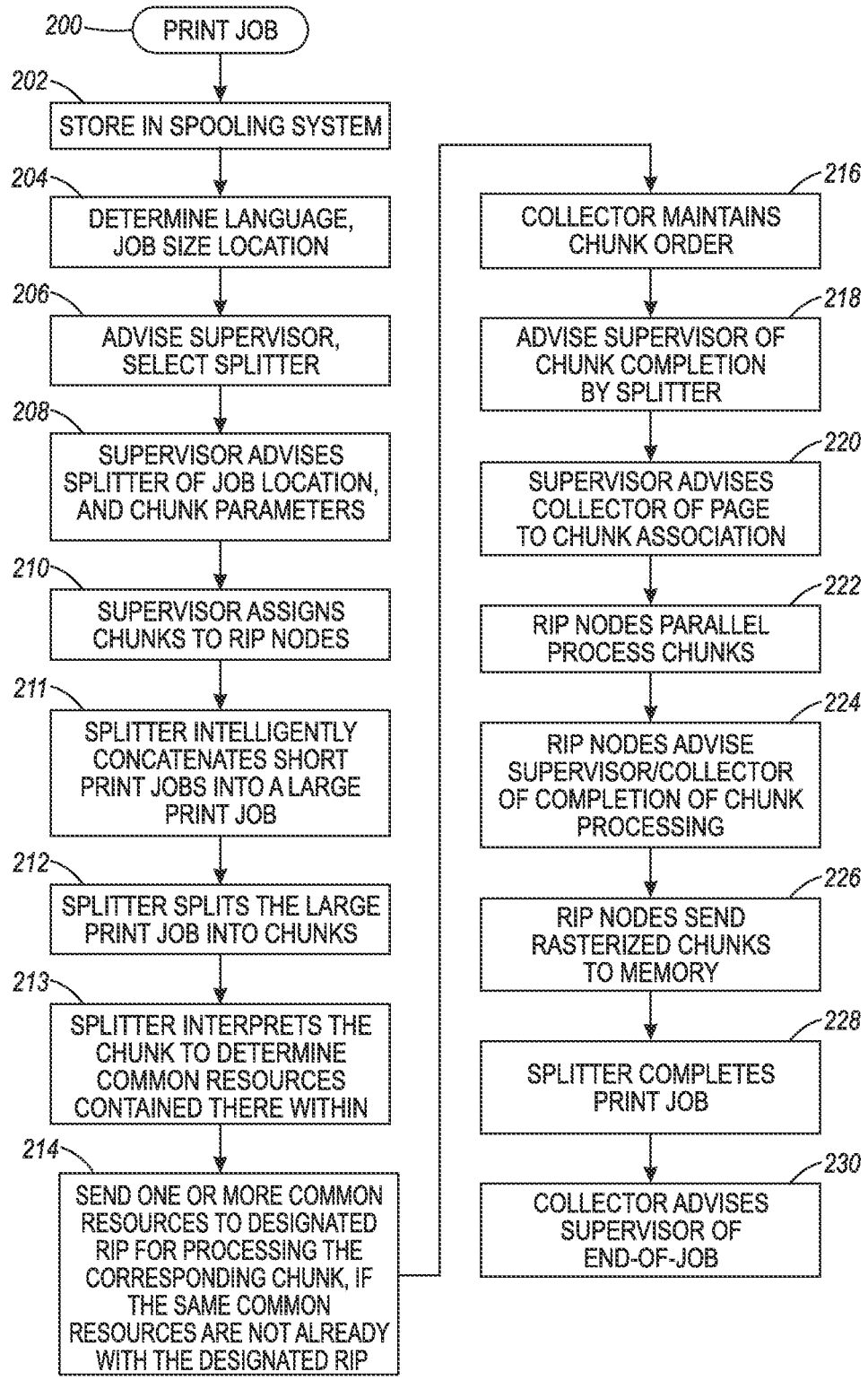
FIG. 3 is a flowchart summarizing a method for processing a plurality of print jobs in accordance with an embodiment of the present disclosure.

FIG. 1 shows a parallel RIP system 500 and FIG. 3 is a flowchart summarizing a method for processing a plurality of document jobs in accordance with an embodiment of the present disclosure. The method is implemented in a computer system that includes one or more processors configured to execute one or more computer program modules.

In general, the system 500 operates by breaking incoming job(s) into chunks, where a chunk is a stream of data in the same language, PDL type or data format as the input job(s), containing all of the data required to describe an integer number of pages in the input job(s). A device or module in the system 500 responsible for breaking the incoming job(s) into chunks is known as a "splitter" 110. The splitter 110 reads its input (i.e., incoming job(s)) either from an input spool disk 102 or directly from an incoming stream, for indefinite length jobs. The splitter 110 then splits the incoming job(s) into chunks, writes its output data to a virtual disk 111, and notifies a supervisor 106 it has done so. The supervisor 106 notifies the target RIP that there is new work for it to do, and the RIP converts the input stream, in any input language, into a print-ready format.

Details of the operation of the parallel RIP system may be found in U.S. Pat. No. 7,872,767, titled "Parallel Printing System"; No. 7,161,705, titled "Parallel Printing System Having Modes For Auto-Recovery, Auto-Discovery Of Resources, And Parallel Processing Of Unprotected Postscript Jobs"; and No. 6,817,791, titled "Idiom Recognizing Document Splitter"; and also may be found in U.S. Patent Application Publication Nos. 2004/0196497, titled "Parallel Printing System Having Flow Control In A Virtual Disk Transfer System"; 2009/0161163, titled "Parallel RIP With Preamble Caching", and 2010/0290080, titled "Resource Partitioning In A Print System," each of these incorporated herein by reference in their entirety.

The present disclosure proposes intelligent concatenation of a plurality of short document jobs into a larger print job, so that subsequently this large print job can be easily and efficiently transferred to the page parallel RIP system 500 for processing. The system combines the short or small document jobs so that common resources among these short document jobs are understood and utilized in the subsequent processing. This resource tracking and optimization feature of the present disclosure enables common resources or items (e.g., fonts, logos, graphics, procedures, etc.) to only be transferred 'once' to the RIP decreasing the processing overhead. The system of the present disclosure, thus, provides a more efficient data handling for the RIP and thus faster RIP times than by simply concatenating document files together.

The system 500 may be implemented as a distributed system, or a centralized service on a single multiprocessor machine, for driving a print engine (not shown).

Referring to FIGS. 1 and 3, when a plurality of small document jobs arrive 200 from a client at job submission/printer management node 100, the input spooling system (not shown) saves 202 the content either in memory or on disk 102. The system 500 determines 204 input language of the received document jobs.

In one embodiment, the plurality of small document jobs includes document jobs having the same PDL type. For example, all of the plurality of small document jobs may have Portable Document Format (PDF) or all of the plurality of small document jobs may have PostScript format.

In another embodiment, the plurality of small document jobs includes document jobs having different PDL types. For example, the different PDL types may include Portable Document Format (PDF) and PostScript format.

That is, the system 500 is configured to convert one PDL type to another PDL type so as to support heterogeneous job concatenation. For example, when the plurality of small document jobs includes a combination of PDF jobs and Post- Script jobs, all PDF document jobs are first converted to a PostScript format before concatenating all the small PostScript document jobs into a large PostScript print job.

In another embodiment, when the plurality of small document jobs includes a combination of PDF jobs and PostScript jobs, all PostScript document jobs are first converted to a PDF format before concatenating all the small PDF document jobs into a large PDF print job.

Further, since PDF jobs are limited to 9999999999 bytes due to ten (decimal) digit offsets referencing objects within the file, PDF document jobs may be combined to yield jobs longer than 9999999999 bytes by converting them to a large PostScript print job.

The system 500 includes a processing manager assembly having a Job manager node 104, a supervisor node 106 and a task manager node 108.

The input spooling system notifies 206 the processing manager assembly for effecting the necessary supervisory functions. For example, the input spooling system informs the job manager node 104 of the input language. The job size (if it has been fully received), and how/where to find the data is also determined 204. Any of several well-known mechanisms may be used to communicate the location of the data, including a network filename for a distributed system, or a memory address for a centralized system.

The job manager node 104 is configured to communicate status information of the print job to the supervisor node 106. That is, as the job manager node 104 is informed of the print job it informs the supervisor node 106, which provides the splitter 110 with "chunk destinations," that is, the identities of the RIPs to receive chunks.

The supervisor node 106 is configured to maintain connections to the other parts (e.g., input spooling system, job manager node 104, RIPs 113, splitter 110, collector 112, task manager 108) of the system 500 to monitor the progress of the print job and for scheduling events.

In one embodiment, when all the received short or small document jobs have the same PDL type, the supervisory node 106 selects 206 the splitter 110 that supports the PDL type of the received document jobs.

In another embodiment, when a plurality of received small document jobs includes different PDL types, the supervisory node 106 selects the splitter 110 that is configured to convert the plurality of received small document jobs into a plurality of document jobs having same PDL type that is supported by the splitter and to combine the plurality of converted document jobs into a large print job.

Although not shown in FIG. 1, the system 500 may include multiple splitters, one per supported PDL type. For example, the system 500 may include a splitter that is capable of splitting PDF documents and another splitter that is capable of splitting PostScript documents. Each splitter may be dedicated to a specific language.

Also, the system 500 may include more than one splitter capable of handling the same PDL type, in order to increase the number of jobs that may be simultaneously handled. That is, a plurality of splitters is intended in a large system, in which the supervisor 106 selects a splitter based on the estimated amount of pending work on all splitters' queues.

The supervisory node 106 informs 208 the selected splitter 110 where to find the document jobs (i.e., the supervisor node 106 does not look at the data), and the splitter 110 may begin splitting the document jobs as soon as it is ready. The supervisor node 106 also informs the splitter 110 of the chunk parameters including the defining threshold boundaries of a chunk (e.g., minimum page count, minimum byte count).

The splitter 110 is configured to combine 211 the plurality of short or small document jobs to form 212 a plurality of chunks. When a large number of small document jobs are received by the page parallel printing system 500, the short or small document jobs are intelligently concatenated or combined using the splitter (also called a "reversible splitter") 110 in a way that they appear to be one large print job to the page parallel printing system 500. Specifically, once a queue full of small document jobs is received, the jobs are sent to the "reversible splitter" or splitter 110. The splitter 110 takes the job stream and joins small document jobs together to form a large print job. The splitter 110 then splits the large print job and outputs right-sized chunks to the parallel RIPs. That is, the system of the present disclosure maintains a small job nature upstream of the splitter, but the behavior would be the same as a large print job downstream of the splitter. The reversible splitter is configured to operate as a normal interpreting splitter if only one document job is sent to the splitter.

The tasks of joining small document jobs and subsequently splitting the resulting large print job may be combined into one operation. In such an embodiment, small document jobs are successively added to the current job, until the chunk size is met or exceeded. Once the resulting job meets or exceeds the chunk size constraint, the resulting job is split, if necessary, into two or more chunks, each falling within the chunking constraints. When the last chunk of the resulting job is smaller than the chunking constraints, one or more additional jobs are concatenated to it, and the cycle continues.

The system 500 further includes a user interface 502 which enables a user to select the received short document jobs to be combined. That is, the user interface 502 is configured to enable a user to select a specific document job set to be sent to the splitter.

The user interface 502 may be a graphical user interface (GUI). Such a graphical user interface has the characteristic that a user may interact with the system using a cursor control device and/or via a touch-screen display, rather than solely via keyboard input device.

The user may simply select (using an input device, such as, a mouse of the user interface 502) short document jobs to be combined. In another embodiment, the user selection may be based on a predefined threshold.

In one embodiment, the predefined threshold is minimum number of print jobs to be combined. In such an embodiment, a processor may be used to monitor a job queue and to initiate the combining feature when the minimum job number is exceeded.

In another embodiment, when the PDL type document jobs allow easy determination of document page count (as is the case for PDF or DSC PostScript), the predefined threshold is minimum number of pages needed in a combined print job. In such an embodiment, the processor may be configured to monitor a job queue and to initiate the combining feature when the minimum page count number is exceeded.

The splitter 110 is configured to split 212 the large (combined) print job into a plurality of chunks and to send the chunks of the job to the plurality of the RIPs for processing.

The splitter 110 is also configured to interpret 213 each chunk to identify common resources contained therewithin and to identify a remainder of each chunk. While joining small document jobs together within chunks, the splitter is configured to do resource consolidation between the resources required for the document jobs present in the chunk. That is, if a chunk contains pages and resources for n document jobs, but those jobs have common resource requirements within the chunk, only one copy of the resource is transmitted in the chunk. The remainder of each chunk includes one or more portions of the chunk that include the information other than the common resources. That is, the remainder of the chunk includes one or more portions of the chunk without the common resources.

The splitter 110 is configured to send 214 the remainder of each chunk and the one or more of the common resources to the designated RIP for processing the corresponding chunk, if the same common resources are not already with the designated RIP. In one embodiment, the common resources may include, but not limited to, embedded fonts, user defined operators and operator overrides, forms, templates, patterns, images, etc. In another embodiment, the common resources or items may include fonts, logos, graphics, etc.

In another embodiment, intelligent concatenation of the present disclosure is not limited to resource management such as fonts, but it is also possible to manage individual PostScript header procedure definitions so that only one copy of a procedure is sent per chunk. This enhancement is feasible in light of fully interpreting PostScript splitter described in detail in co-pending application, U.S. patent application Ser. No. 13/435,412, assigned to the same assignee of the present application. The entire disclosure of this co-pending application is incorporated herein by reference in its entirety.

More specifically, as discussed in U.S. patent application Ser. No. 13/435,412 (the '412 application), mentioned above, the fully interpreting PostScirpt splitter used to intelligent concatenate of the plurality of document jobs of the present application is configured handle Turing Complete input languages. Input languages may include PostScript, VIPP and any other Turing Complete language. That is, the aspects of this present disclosure are applicable to any page description language which is Turing Complete. In the parlance of computer programming languages, a language is said to be Turing Complete if it provides the means of expression for input, output, conditional branching, and (essentially) unbounded numbers of stored variables. A Turing Complete programming language is sufficient for expressing any computer program.

In general, a page description language (PDL) is a language which allows the appearance of a printed page (such as how to form the type and graphic elements on it) to be described in a high-level, device-independent way. Rather than download a font to the printer, for example, the PDL gives the printer instructions on how to draw each character from outlines; graphics are produced in a similar way.

In a Turing Complete page description language, programming instructions are interpreted in order to indicate the page boundaries of the print job.

PostScript is unusual among page description languages. While interpreting DSC comments and PDF format requires only a simple stack-based interpreter, interpreting PostScript requires a much more complete implementation. In the language of the Chomski hierarchy, PostScript is Turing Complete. That is, PostScript programs requires arbitrarily much state, requires the evaluation of conditions, and provides access to a file system (read and write).

The received print job includes objects described in a page description language. Objects may include complete descriptions of fonts, placement, size and font information for characters, groups of one or more graphical commands and pixel data defining images. Objects may include groups of other objects. In general, the term object is used here in the same sense as it is used in the description of Adobe's Portable Document Format (PDF).

In another embodiment, as the splitter interprets each document job it identifies common resources contained therewithin, inserts those common resources into the appropriate chunks for designated RIPs (i.e., placing them into the appropriate chunks to be sent to designated RIPs), if the those common resources were not already sent to the designated RIPs.

The splitter is aware of resources that are needed for each chunk and can make use of this information to combine multiple input files without forcing chunk boundaries at the end of each input file. If resources change between the document jobs within the chunk, this is no different than if the resources change within a single document job for a non-reverse interpreting splitter.

The splitter is configured to maintain knowledge of what information has already been sent to each of multiple RIPs 113 and avoids sending redundant information to the RIPs 113. This information may include resources (e.g., fonts, logos, graphics, etc.), header procedure definitions, etc.

At each page boundary the splitter 110 checks whether the page count or byte count has been exceeded, and if either one has, the splitter 110 finishes that chunk. As the splitter 110 splits 212 the large job into chunks, it sends the chunk to the next destination RIP it has received from the supervisor 106. The splitter 110 writes the chunk into either the memory or the disk associated with the node of the destination RIP. In one embodiment, the data for a chunk is written into the memory, rather than disk.

Although not shown in FIG. 1, the system 500 includes a plurality of RIPs 113 for parallel processing of the large (combined) print job into a printer-ready format for the printing of the combined print job.

The splitter 110 transfers the chunks to the virtual disk 111 and the RIP 113 receives the chunk from the virtual disk 111. Details of the virtual disk are described in detail, for example, in U.S. Pat. No. 7,872,767, titled "Parallel Printing System," which is incorporated herein by reference in its entirety. After the splitter 110 writes the first page of a chunk, it notifies the supervisor 106, which, in turn, notifies the RIP node 113.

When the splitter 110 reaches the end of a chunk, that being the first page boundary after a fixed number of bytes or pages, the splitter 110 notifies the supervisor 106, but it does not close the file in the virtual disk 111. When the supervisor 106 receives the end of chunk notification message (including which pages have been written) from the splitter 110, the supervisor 106 informs 220 the collector 112 of which pages to associate with a given chunk. The collector 112 maintains 216 a set of jobs in the system, and for each job, a list of chunks in order of arrival.

When the splitter 110 encounters 228 the end of a print job, the splitter 110 closes all of the files associated with active chunks. In order to allow the supervisor 106 to continue scheduling chunks appropriately, the splitter 110 informs the supervisor 106 of the number of pages and their identities (if they are not contiguous). When the supervisor 106 receives the end of job notification message from the splitter 110, the supervisor 106 informs the collector 112 to expect no more new chunks for that job.

After the splitter has written several chunks, multiple parallel RIP nodes 113 operate in parallel, writing pages of print ready data. Preferably this data is written in compressed form, such as mixed raster content files, to internal memory data buffers.

As RIPs 113 complete processing their chunks they write their output (i.e., print ready data) to an output destination 117. The output destination 117 may be a hard disk, a virtual disk, or a buffer of memory directly readable by a printing system. The RIPs 113 then notify the supervisor node 106, which uses that information to inform the collector 112, and to maintain a model of how long chunks take to be processed.

The supervisor 106 also collaborates with the collector 112 to determine when chunks have completed and uses that information to assign new chunk destinations.

The compressed output pages for the completed output job are returned to printer management 100 for transmission to a print engine.

As a RIP node completes a chunk, it sends 224 a message to the supervisor 106, which passes the message onto the collector 112. The collector 112 notes that this chunk is complete, and as long as it finds the first in the list for this job is complete, it removes the first in the list, and informs the supervisor 106. The supervisor 106 notifies the input spooling system of the location of the output data for that chunk.

When the collector 112 receives the last message from the supervisor 106 that a RIP node has completed a chunk, it knows it because that job has an associated end-of-job message, and the list of chunks becomes empty when that chunk is removed from the list. The collector 112 then informs 230 the supervisor 106, which informs the input spooling system 102 that the job is complete.

The collector 112 sorts notification messages and returns them to the supervisor node 106 in order, sorted by page number within job. That is, the collector 112 is configured to serialize chunk complete messages and to maintain a collection of node addresses to which chunks of each job being processed have been sent so that triggering the removal of the corresponding objects when the job is completely processed.

Since the actual pages printed contain the pages from a number of short, input document jobs, downstream system components are configured to take the stream of pages printed and divide them back into the small jobs. This operation may be handled by a print finishing system.

The time required to RIP a job is more closely related to the number of bytes in the job than to the number of pages. For this reason an alternative embodiment of the present disclosure includes a reversible splitter that combines jobs smaller than a prescribed size, with no regard to page count, but splits larger jobs at page boundaries.

Though the system of the present disclosure is described above in the context of the page parallel printing system, the system may also be used as a standalone application for the combining of many small or short document jobs into one large print job file (following the manner described above).

The system may also be used to accelerate a non-parallel system's handling of small jobs, by combining them into larger jobs, thereby eliminating the short-job overhead.

The system of the present disclosure, thus, combines a plurality of small document jobs into a large print job, while converting PDL type and optimizing resources. The system of the present disclosure simultaneously combines document jobs to output a large print job and breaks the resulting print job into chunks.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A parallel Raster Image Processor system comprising:
    a plurality of Raster Image Processors (RIPs) for parallel processing of a plurality of document print jobs into a printer-ready format for printing of the document print jobs, wherein the plurality of document print jobs are submitted to a print queue by a user and each document print job includes data to be printed by a printing system; and
    a splitter configured to:
    combine the plurality of document print jobs in the print queue into a single job and split the single job, which is comprised of the combined plurality of document print jobs, into a plurality of chunks, each chunk being sent to a respective designated RIP for processing, wherein at least one document print job comprises resources described in a Turing Complete page description language in which programming instructions are interpreted so as to indicate page boundaries of the document print job, wherein at least one of the resources includes a description, in the Turing complete page description language of a font, placement size and font information for one or more characters, a group of one or more graphical commands, or pixel data defining an image in the document print job, wherein each document print job comprises a document print job having a Page Description Language (PDL) type, and wherein each chunk includes common resources defined therein and one or more of the plurality of document print jobs;
    interpret the descriptions, in the Turing complete page description language, in each chunk to identify common resources defined therewithin and a remainder of each chunk, the remainder of each chunk including one or more portions of the chunk that include information other than the common resources; and
    send the remainder of each chunk to the designated RIP for processing and send one or more of the identified common resources defined in a corresponding chunk to the designated RIP for processing the corresponding chunk, if the same common resources are not already with the designated RIP.

2. The system of claim 1, wherein the plurality of document print jobs comprises document print jobs having PostScript format.

3. The system of claim 1, wherein the plurality of document print jobs comprises document print jobs having the same Page Description Language (PDL) type.

4. The system of claim 1, wherein the plurality of document print jobs comprises document print jobs having different PDL types.

5. The system of claim 4, wherein the different PDL types include Portable Document Format (PDF) and PostScript format.

6. The system of claim 5, wherein the document print jobs in Portable Document Format (PDF) are converted into PostScript format before combining the document print jobs.

7. The system of claim 4, wherein the document print jobs are converted into a common PDL type before combining the document print jobs.

8. The system of claim 1, further comprising a user interface which enables a user to select the document print jobs to be combined.

9. The system of claim 1, wherein the document print jobs to be combined are based on a predefined threshold.

10. The system of claim 9, wherein the predefined threshold is a minimum number of document print jobs to be combined.

11. The system of claim 9, wherein the predefined threshold is a minimum number of pages needed in a combined print job.

12. A method of operating a printing system for parallel processing of a plurality of document print jobs with a plurality of Raster Image Processors (RIPs) into a printer-ready format for printing of the document print jobs, wherein the method is implemented in a computer system comprising one or more processors configured to execute one or more computer program modules, the method comprising:
  combining, using a splitter, the plurality of document print jobs in a print queue into a single job, and splitting the single print job, which is comprised of the combined plurality of document print jobs, into a plurality of chunks, each chunk being sent to a respective designated RIP for processing, wherein each document print job comprises a document print job having a Page Description Language (PDL) type, wherein at least one document print job comprises resources described in a Turing Complete page description language in which programming instructions are interpreted so as to indicate page boundaries of the document print job, wherein at least one of the resources includes a description, in the Turing Complete page description language of a font, placement size and font information for one or more characters, a group of one or more graphical commands, or pixel data defining an image in the document print job, wherein each chunk includes common resources defined therein and one or more of the plurality of document print jobs, and wherein the plurality of document print jobs are submitted to the print queue by a user and each document print job includes data to be printed by the printing system;
  interpreting, using the splitter, the descriptions, in the Turing Complete page description language, in each chunk to identify common resources defined therewithin and a remainder of each chunk, the remainder of each chunk including one or more portions of the chunk that include information other than the common resources; and
  sending the remainder of each chunk to the designated RIP for processing and sending one or more of the identified common resources defined in a corresponding chunk to the designated RIP for processing the corresponding chunk, if the same common resources are not already with the designated RIP.

13. The method of claim 12, wherein the plurality of document print jobs comprises document print jobs having PostScript format.

14. The method of claim 12, wherein the plurality of document print jobs comprises document jobs having the same Page Language Description (PDL) type.

15. The method of claim 12, wherein the plurality of document print jobs comprises document print jobs having different PDL types.

16. The method of claim 15, wherein the different PDL types include Portable Document Format (PDF) and PostScript format.

17. The method of claim 16, wherein the document print jobs in Portable Document Format (PDF) are converted into PostScript format before combining the document jobs.

18. The method of claim 15, wherein the document print jobs are converted into a common PDL type before combining the document print jobs.

19. The method of claim 12, further comprising a user interface which enables a user to select the document print jobs to be combined.

20. The method of claim 12, wherein the document print jobs to be combined are based on a predefined threshold.

21. The method of claim 20, wherein the predefined threshold is a minimum number of document print jobs to be combined.

22. The method of claim 20, wherein the predefined threshold is a minimum number of pages needed in a combined print job.

23. A reversible splitter device configured to:
  combine a plurality of document print jobs in a print queue into a single job, and split the single job, which is comprised of the combined plurality of document print jobs, into a plurality of chunks, the plurality of document print jobs being received by a Raster Image Processor system comprising at least one Raster Image Processor (RIP) and each chunk being sent to a respective designated RIP for processing, wherein each document print job comprises a document print job having a Page Description Language (PDL) type, wherein at least one document print job comprises resources described in a Turing Complete page description language in which programming instructions are interpreted so as to indicate page boundaries of the document print job, wherein at least one of the resources includes a description, in the Turing complete page description language of a font, placement size and font information for one or more characters, a group of one or more graphical commands, or pixel data defining an image in the document print job, wherein each chunk includes common resources defined therein and one or more of the plurality of document print jobs, and wherein the plurality of document print jobs are submitted to the print queue by a user and each document job includes data to be printed by a printing system;
  interpret the descriptions, in the Turing Complete page description language, in each chunk to identify common resources defined therewithin and a remainder of each chunk, the remainder of each chunk including one or more portions of the chunk that include information other than the common resources; and
  send the remainder of each chunk to the designated RIP for processing and send one or more of the identified common resources defined in a corresponding chunk to the designated RIP for processing the corresponding chunk, if the same common resources are not already with the designated RIP.

24. The reversible splitter device of claim 23, wherein the Raster Image Processor system comprises a plurality of Raster Image Processors (RIPs) operating in parallel.

25. The reversible splitter device of claim 23, wherein the at least one chunk comprises a plurality of chunks.

26. The reversible splitter device of claim 23, wherein the plurality of document print jobs comprises document print jobs having PostScript format.

* * * * *